United States Patent
Bode et al.

(10) Patent No.: US 7,247,874 B2
(45) Date of Patent: *Jul. 24, 2007

(54) DEVICE FOR DETECTING INFORMATION CONTAINED IN A PHOSPHOR LAYER

(75) Inventors: Andreas Bode, Munich (DE); Georg Reiser, Munich (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 86 days.

This patent is subject to a terminal disclaimer.

(21) Appl. No.: 10/853,301

(22) Filed: May 25, 2004

(65) Prior Publication Data
US 2004/0238765 A1    Dec. 2, 2004

(30) Foreign Application Priority Data
May 26, 2003   (EP) .................... 03101518

(51) Int. Cl.
*G01N 23/04* (2006.01)
*G01T 1/105* (2006.01)
*G02B 26/10* (2006.01)
*G03B 42/08* (2006.01)

(52) U.S. Cl. .................... 250/585
(58) Field of Classification Search ............. 250/584, 250/585, 586
See application file for complete search history.

(56) References Cited

U.S. PATENT DOCUMENTS

| | | | |
|---|---|---|---|
| 4,258,264 A | 3/1981 | Kotera et al. | |
| 6,052,212 A * | 4/2000 | Cobb | 359/208 |
| 6,577,453 B2 * | 6/2003 | Kimura | 359/730 |
| 6,601,970 B2 * | 8/2003 | Ueda et al. | 362/217 |
| 6,642,535 B2 | 11/2003 | Gebele et al. | |
| 6,832,843 B2 * | 12/2004 | Adler et al. | 362/247 |
| 6,861,662 B2 * | 3/2005 | Chikugo | 250/589 |
| 2002/0006039 A1 * | 1/2002 | Ueda et al. | 362/217 |
| 2005/0117336 A1 * | 6/2005 | Jenny | 362/232 |

FOREIGN PATENT DOCUMENTS

| | | |
|---|---|---|
| EP | 1 205 770 A2 | 5/2002 |
| EP | 03 10 1518 | 11/2003 |
| WO | WO 03/029848 A1 | 4/2003 |

* cited by examiner

*Primary Examiner*—David Porta
*Assistant Examiner*—Frederick F Rosenberger
(74) *Attorney, Agent, or Firm*—Houston Eliseeva LLP

(57) ABSTRACT

Device for detecting information which is contained in a phosphor layer, with multiple individual radiation sources for emitting stimulation light incident upon the phosphor layer along a stimulation line and suitable for stimulating emission light in the phosphor layer, and a detector for detecting the emission light which is stimulated in the phosphor layer. To ensure the highest possible quality of the detected image, an elongated concave mirror is provided, for focusing the stimulation light emitted by the individual radiation sources onto the phosphor layer.

11 Claims, 2 Drawing Sheets

DEVICE FOR DETECTING INFORMATION CONTAINED IN A PHOSPHOR LAYER

FIELD OF THE INVENTION

The invention concerns a device for detecting information which is contained in a phosphor layer.

BACKGROUND OF THE INVENTION

Devices for detecting information which is contained in a phosphor layer are used in the field of computer radiography (CR), particularly for medical purposes. X-ray images are recorded in a phosphor layer, X-ray radiation which passes through an object, for instance a patient, being stored as a latent image in the phosphor layer. To read out the latent image, the phosphor layer is irradiated with stimulation light and thus stimulated to emit emission light, which corresponds to the latent image which is stored in the phosphor layer. The emission light is detected by an optical detector and converted into electrical signals, which are processed further as required, and presented on a monitor or an appropriate output device, e.g., a printer.

From the prior art, devices in which the stimulation light from a light source is focused on a linear area of the phosphor layer are known. For focusing, in general cylinder lenses are used. However, in cases in which the light source is formed by multiple individual radiation sources, there is the problem that the sharpness of the stimulation line on which the stimulation line bundles emitted from the individual radiation sources are focused, varies along the stimulation line depending on the distance of the individual radiation sources. For instance, an equidistant arrangement of the individual radiation sources results in a periodic variation of the sharpness of the stimulation line. The breadth of the stimulation line on the phosphor layer also varies with the sharpness of the focusing of the stimulation light. This affects the image quality, since for this the sharpest possible delimitation of the stimulation line is required.

SUMMARY OF THE INVENTION

The present invention provides a device for detecting information which is contained in a phosphor layer, and with which the highest possible image quality is ensured. This is achieved using an elongated, particularly cylindrical, concave mirror for focusing the stimulation light emitted by the individual radiation sources onto the phosphor layer. The device comprises multiple individual radiation sources for emitting stimulation light incident upon the phosphor layer along a stimulation line and suitable for stimulating emission light in the phosphor layer, a detector for detecting the emission light which is stimulated in the phosphor layer, and an elongated concave mirror for focusing the stimulation light emitted by the individual radiation sources onto the phosphor layer.

By using an elongated concave mirror according to the invention, the occurrence of variations of the sharpness and breadth of the stimulation line on the phosphor layer can be greatly reduced compared with the use of cylinder lenses. In this way, with light sources consisting of multiple individual radiation sources, a high degree of evenness of the sharpness and breadth of the stimulation line is achieved, and thus high quality of the image which is read out of the phosphor layer.

In a preferred embodiment, it is provided that the individual radiation sources are arranged along a line which runs, in particular, parallel to the stimulation line. In this way, even higher homogeneity of the breadth of the stimulation line is easily achieved.

Another embodiment provides that the individual radiation sources each emit stimulation light bundles, which are focused by the concave mirror onto the stimulation line, and at least partially superimpose themselves on the stimulation line. By superposition of the individual stimulation light bundles in the direction of the stimulation line, high intensity of the stimulation light is achieved, with simultaneous low intensity variations along the stimulation line.

Preferably, the concave mirror is arranged parallel to the stimulation line. In this way, variations of sharpness and breadth can easily be further reduced.

In another preferred embodiment of the invention, it is provided that the concave mirror is in the form of a cylinder mirror, which in cross-section has the form of an arc of a circle. In alternative variants of this embodiment, the cylinder mirror is aspherical in cross-section, particularly in the form of an arc of an ellipse or parabola. With all the above-mentioned cross-section forms of the cylinder mirror, a great reduction of the variations of sharpness and breadth of the stimulation line compared with correspondingly formed cylinder lenses is achieved.

In another embodiment, it is provided that the optical axis in the cross-section of the concave mirror, which has, in particular, a cross-section in the form of a circular arc, cuts the concave mirror in a vertex, and that the radiation sources are tilted by a tilt angle around the vertex against the optical axis of the concave mirror. By tilting the radiation sources against the optical axis of the concave mirror, the stimulation line, on which the stimulation light from the individual radiation sources is focused, is tilted in the opposite direction against the optical axis of the concave mirror. Thus, by an appropriate choice of tilt angle, the distance of the radiation sources from the stimulation line can be adapted to structural requirements.

Preferably, the distance d, along the optical axis in the cross-section of the concave mirror, of the radiation sources and/or the stimulation line from the vertex of the concave mirror satisfies the relationship $d = R \cos^2 \omega$, where R designates the radius of curvature of the concave mirror and $\omega$ designates the tilt angle. In this way, projection errors which are caused by astigmatism and coma, and increase with increasing tilt angle $\omega$, can be kept very small, so that high projection sharpness and thus image quality are ensured.

In another embodiment of the invention, it is provided that the radiation sources are projected onto the phosphor layer by the concave mirror, which has, in particular, a cross-section in the form of a circular arc, at a scale of 1:M, where M takes a value between about 0.5 and 2. The projection scale, i.e., the ratio of image size to object size, thus takes a value between 2:1 (M=0.5, enlargement) and 1:2 (M=2, reduction). In this way projection errors, particularly those caused by astigmatism and coma, are greatly reduced, whereby a high degree of sharpness in the projection of the radiation sources onto the phosphor layer is achieved. This ensures high quality of the image which is read out from the phosphor layer.

Another embodiment of the invention provides that the detector has multiple detector elements which are arranged parallel to the stimulation line. In this way, location-resolved detection of the emission light from the stimulation line is made possible.

BRIEF DESCRIPTION OF THE DRAWINGS

The invention is explained in more detail below on the basis of the following figures.

DETAILED DESCRIPTION OF THE INVENTION

Figure 1:
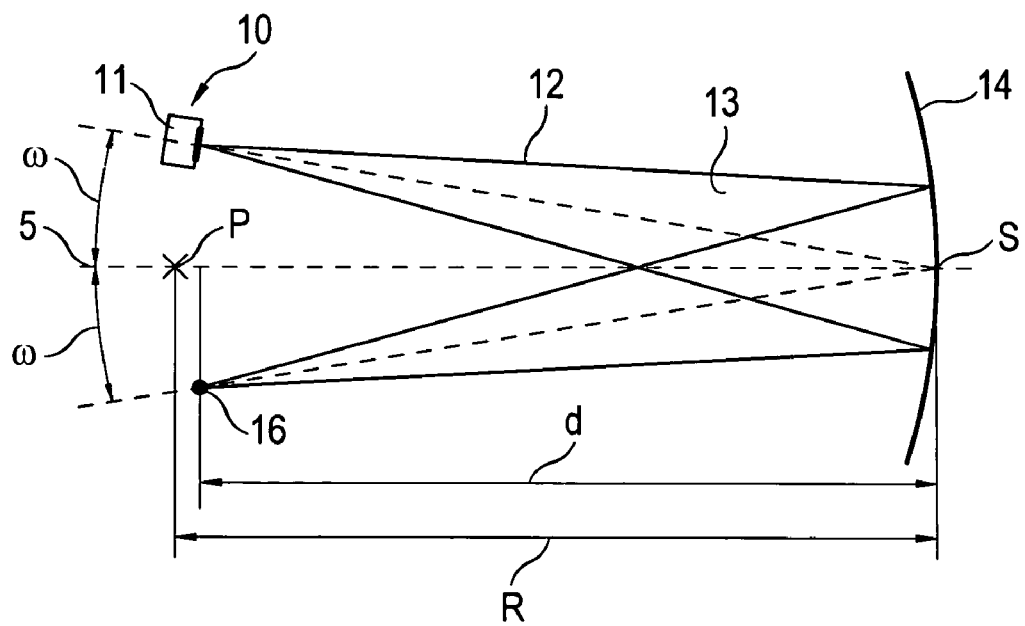
FIG. 1 shows a first embodiment of the invention in side view.

FIG. 1 shows a first embodiment of the invention in side view. A light source 10 emits stimulation light 12 in the form of a divergent stimulation light bundle 13 in the figure plane, and this stimulation light bundle 13 is reflected on an elongated concave mirror 14, which runs vertically to the figure plane, and is focused on a stimulation line 16 which also runs vertically to the figure plane.

Figure 2:
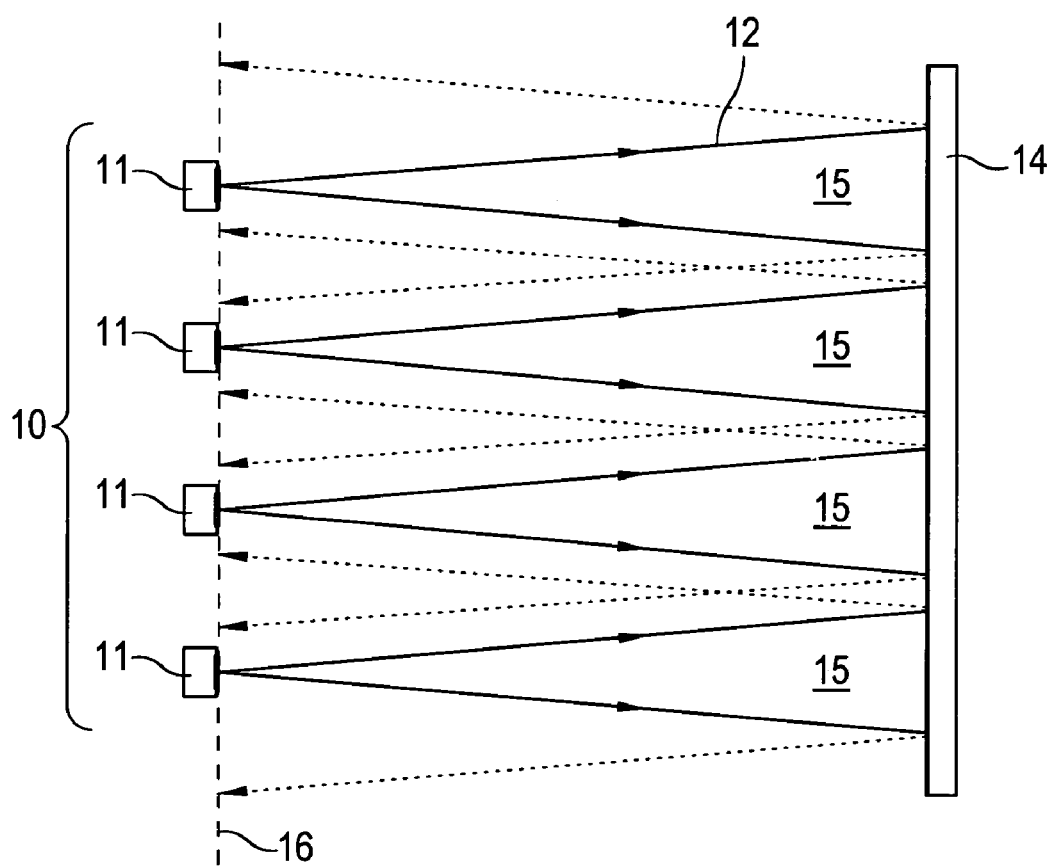
FIG. 2 shows the first embodiment shown in FIG. 1, in plan view.

In this example, the light source 10 comprises individual radiation sources 11, which are arranged along a line. This is illustrated in FIG. 2, which shows the first embodiment shown in FIG. 1 in plan view. The radiation sources 11 of the light source 10, which are arranged along a straight line, emit stimulation light 12, which has, also in the plane of FIG. 2, the form of divergent stimulation light bundles 15. The divergent stimulation light bundles 15 of the individual radiation sources 11 in the plane of FIG. 2 are reflected on the concave mirror 14 and superimpose themselves on the stimulation line 16. As can be seen in FIG. 2, the individual radiation sources 11 and the elongated concave mirror 14 are arranged parallel to the stimulation line 16. The stimulation line 16 lies on a phosphor layer (not shown) from which a latent image which is stored in it is to be read.

In this embodiment, the elongated concave mirror 14 is in the form of a cylinder mirror, the cross-section of which is in the form of a circular arc. Such cylinder mirrors can be manufactured economically, and with the described devices they result in a great reduction of projection errors.

However, the cross-section of the cylinder mirror can also be aspherical, i.e., deviate from the shape of a circular arc. In this way, variations of intensity, sharpness and breadth along the stimulation line 16 can be additionally reduced. In particular, the cylinder mirror can have a cross-section in the form of an arc of an ellipse. A cylinder mirror in this form has two focal lines, the light source 10 being arranged in a first focal line and the stimulation line 16 running along a second focal line. In this case, for any projection scales, aberration-free focusing of the stimulation light 12, and thus very sharp delimitation of the stimulation line 16, are achieved. However, the cylinder mirror can also have the form of an arc of a parabola in cross-section. This is advantageous, for instance, if the stimulation light 12 which is emitted by the light source 10 has the form of a parallel light bundle or a light bundle with only a very small divergence.

In the shown example, the elongated concave mirror 14 has straight surface lines which run vertically to the plane of FIG. 1. However, within the invention the elongated concave mirror 14 can also have a form in which the surface lines are curved. In this way a further degree of freedom in the form of the concave mirror 14, and thus in the reduction of projection errors, for instance because of additional optical components in the beam path of the stimulation light bundle 13, is obtained.

As FIG. 1 shows, the light source 10 and stimulation line 16 are each tilted by a tilt angle ω relative to the optical axis 5 of the concave mirror 14. The tilt is around the vertex S, where the optical axis 5 cuts the concave mirror 14. By choosing the tilt angle α, the distance between the light source 10 and stimulation line 16 can be adapted to structural requirements, e.g., a particular lighting and/or detection geometry.

By using an elongated concave mirror 14 for focusing the divergent stimulation light bundle 13 from the individual radiation sources 11, a stimulation line 16 which is significantly more sharply delimited, and the breadth of which is more homogeneous, is obtained than is achieved with focusing of the stimulation light 12 using cylinder lenses, as is known from the prior art. This can be explained because in the focusing of the individual stimulation light bundles 13 of the radiation sources 11 using cylinder lenses, projection errors occur along the stimulation line 16 because of curvature of the individual focal lines, also called focus bow, resulting in variation of the sharpness and consequently of the breadth of the line. By using an elongated concave mirror, these projection errors are eliminated or at least greatly reduced, so that variation of the breadth of the stimulation line 16 in the linear direction is avoided or reduced. In this way, even with a light source 10 consisting of multiple individual radiation sources 11, an evenly broad and sharply delimited stimulation line 16 is obtained on the phosphor layer.

In the first embodiment, which is shown in FIGS. 1 and 2, the light source 10 is projected onto the stimulation line 16 at the scale of 1:1. The scale here refers to projection or focusing in the plane of FIG. 1. By this 1:1 projection, projection errors which cause, in particular, lack of sharpness in the projection of the light source 10 onto the stimulation line 16, are greatly reduced. In particular, in this way projection errors because of spherical aberration are avoided. However, the sharp delimitation (which is required for high image quality) of the stimulation line 16 is not only achieved with a projection scale of 1:1, but also with scales between 1:2 and 2:1. With projection scales other than 1:1, within the range from 1:2 to 2:1, projection errors occur because of spherical aberration, astigmatism and coma, but surprisingly these are so small that nevertheless very high image quality can be ensured.

To keep projection errors because of astigmatism and coma particularly low, the distance of the light source 10 and/or stimulation line 16 from the concave mirror 14 is chosen depending on the chosen tilt angle α. In particular, the distance d, along the optical axis 5 in the cross-section of the concave mirror 14, of the individual radiation sources 11 and/or the stimulation line 16 from the vertex S of the concave mirror 14 satisfies the equation $d = R\cos^2\omega$, where R designates the radius of curvature of the concave mirror. In the case of the concave mirror 14, which in the example of FIG. 1, as a cylinder mirror, has a cross-section in the form of an arc of a circle, the radius of curvature R corresponds to the distance of the circular arc from the centre P of this circle.

In the first embodiment of FIGS. 1 and 2, the light source 10 comprises multiple radiation sources 11, which are arranged along a straight line. Alternatively, the light source 10 can also be in the form of a linear light source, which emits the stimulation light 12 along a continuous line. In this case, in contrast to a light source 10 consisting of multiple individual radiation sources 11, breadth variations along the stimulation line 16 no longer occur. Projection errors because of spherical aberration and/or astigmatism are greatly reduced by the use according to the invention of an elongated, particularly cylindrical, concave mirror, so that significantly increased sharpness of the stimulation line is achieved.

In another alternative form, the light source 10 has only one radiation source 11. The stimulation light bundle 13 from the radiation source 11 is periodically deflected by a deflection device, and focused by the elongated concave mirror 14 onto a dot-shaped or linear focal area on the phosphor layer. Because of the periodic deflection of the stimulation light bundle 13, the focal area spreads over the phosphor layer along the stimulation line 16. The emission light which is stimulated in each case is captured by a detector. Devices of this type are also called flying spot systems. In such systems, projection errors which would result in lack of sharpness and expansion of the focal area and thus a reduction of image quality are significantly reduced by the invention.

Figure 3:
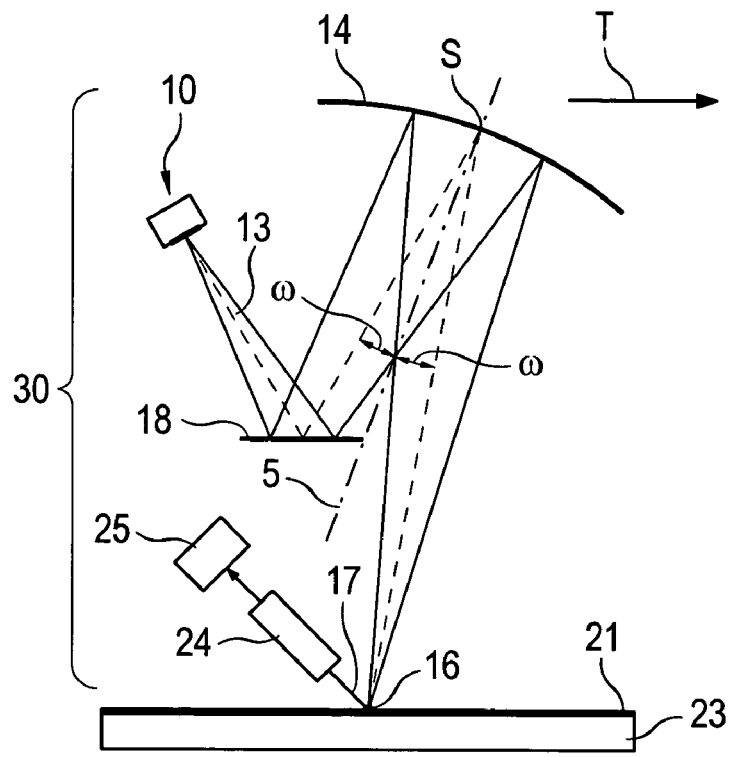
FIG. 3 shows a second embodiment of the invention.

FIG. 3 shows a second embodiment of the invention. In this embodiment, the divergent stimulation light bundles 13, which are emitted from the light source 10, are first reflected on an elongated plane mirror 18, before they meet the elongated concave mirror 14 and are focused by it along the stimulation line 16 onto the phosphor layer 21, which is stabilized mechanically by a carrier layer 23. By using the plane mirror 18, compared with the first embodiment which is shown in FIG. 1, additional options for the spatial arrangement of the light source 10, the concave mirror 14 and the phosphor layer 21 are obtained, making it possible to adapt the device according to the invention to structural requirements without causing additional projection errors.

Instead of the plane mirror 18, a suitable optical prism can be used to deflect the stimulation light bundle 13. It is also possible to use an elongated convex mirror or another elongated concave mirror to deflect the stimulation light bundle 13.

In this example, the light source 10, the concave mirror 14 and the stimulation line 16 on the phosphor layer 21 are arranged spatially relative to each other similarly to the first embodiment which is shown in FIGS. 1 and 2. In particular, the light source 10 and plane mirror 18 are arranged so that the light source 10 is also tilted by a tilt angle ω (virtual in this case) against the optical axis 5 of the concave mirror 14. The distances of the light source 10 and phosphor layer 21 from the vertex S of the concave mirror 14 are also chosen so that 1:1 projection—in relation to the plane of FIG. 3—takes place, and thus projection errors are reduced to a minimum.

The emission light 17 which is stimulated along the stimulation line 16 in the phosphor layer 21 is projected onto the detector 25 by projection optics 24. The detector 25 is in the form of a linear detector, which has multiple individual detector elements which are arranged parallel to the stimulation line 16. Also parallel to the linear detector 25, run the projection optics 24 (which are preferably in the form of a linear micro-lens or gradient index lens array, particularly a self-focusing lens array). For reading out the latent image which is stored in the phosphor layer 21, the device which is combined into a read unit 30 is moved in a transport direction T over the phosphor layer 21, which is successively stimulated and read out along the stimulation line 16. Alternatively or additionally to the movement of the read unit 30, the phosphor layer 21 on the carrier layer 23 can be moved relative to the read unit 30.

Figure 4:
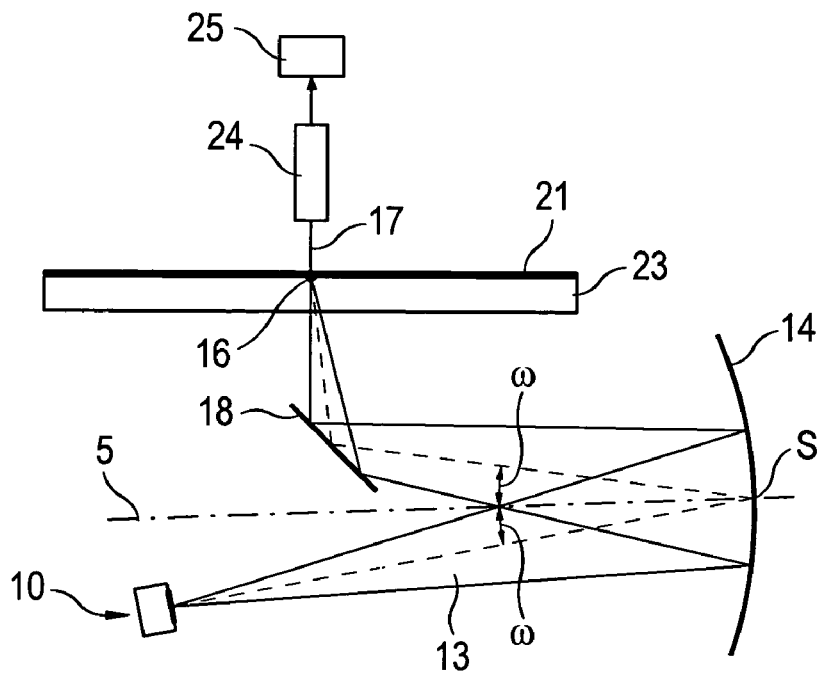
FIG. 4 shows a third embodiment of the invention.

FIG. 4 shows a third embodiment of the invention, with a specially compact construction. In this example, the cross-section of the concave mirror 14 is oriented substantially vertically to the phosphor layer 21, so that the distance of the light source 10 from the phosphor layer 21 can be reduced. In this example, the divergent stimulation light bundles 13 from the light source 10 hit the concave mirror 14 directly and are focused by it onto the stimulation line 16. A plane mirror 18 is inserted into the beam path between the concave mirror 14 and the phosphor layer 21, and deflects the light bundle which is reflected by the concave mirror 14, and is now convergent, onto the stimulation line 16. In this embodiment, the plane mirror 18 opens up multiple possibilities for arranging the light source 10, concave mirror 14 and phosphor layer 21 relative to each other, so that in particular a very compact arrangement of the individual components can be achieved.

In the embodiment of FIG. 4 which is shown here, the phosphor layer 21 to be read out is on a carrier layer 23, which is transparent to the stimulation light, so that the phosphor layer 21 can be stimulated from below. In the shown case, the emission light 17 is projected from above through projection optics 24 onto a detector 25. Alternatively, however, the emission light 17 can be captured from below through the transparent carrier layer 23. Regarding the projection optics 24 and detector 25, the explanations of the second embodiment, which is shown in FIG. 3, apply correspondingly. Regarding the choice according to the invention of the elongated concave mirror 14, of the angle of inclination ω and of the projection scale, the explanations corresponding to the embodiments which are described in FIGS. 1 to 3 also apply correspondingly.

The invention claimed is:

1. Device for detecting information which is contained in a phosphor layer, comprising:
   multiple individual radiation sources for emitting stimulation light incident upon the phosphor layer along a stimulation line and suitable for stimulating emission light in the phosphor layer,
   a detector for detecting the emission light which is stimulated in the phosphor layer, and
   an elongated concave mirror for focusing the stimulation light emitted by the individual radiation sources onto the phosphor layer,
   wherein the concave mirror has an optical axis in a plane of a cross-section of the concave mirror and said optical axis cuts the concave mirror in a vertex (S),
   wherein the radiation sources are tilted by a tilt angle (ω) around the vertex (S) relative to the optical axis of the concave mirror, and
   wherein there is a distance (d) between the radiation sources and/or the stimulation line on the one hand and the vertex (S) on the other hand, said distance (d) running along said optical axis in the plane of the cross-section of the concave mirror and satisfying the relationship $d = R \cos^2 \omega$, where R designates a radius of curvature of the concave mirror.

2. Device according to claim 1, wherein the individual radiation sources are arranged along a line which runs parallel to the stimulation line.

3. Device according to claim 1, wherein the individual radiation sources each emit stimulation light bundles, which are focused by the concave mirror onto the stimulation line and at least partly superimpose on the stimulation line.

4. Device according to claim 1, wherein the concave mirror is arranged parallel to the stimulation line.

5. Device according to claim 1, wherein the concave mirror is in the form of a cylinder mirror, which in cross-section has the form of a circular arc.

6. Device according to claim 1, wherein the concave mirror is in the form of a cylinder mirror, the cross-section of which is aspherical.

7. Device according to claim 6, wherein the concave mirror is in the form of a cylinder mirror, which in cross-section has the form of an arc of an ellipse or parabola.

8. Device according to claim 1, wherein the detector has multiple detector elements which are arranged parallel to the stimulation line.

9. Device for detecting information which is contained in a phosphor layer, comprising:
    multiple individual radiation sources for emitting stimulation light incident upon the phosphor layer along a stimulation line and suitable for stimulating emission light in the phosphor layer,
    a detector for detecting the emission light which is stimulated in the phosphor layer, and
    a single elongated concave mirror for focusing the stimulation light emitted by the individual radiation sources onto the phosphor layer with no other concave mirrors being used between the individual radiation sources and the phosphor layer,
    wherein the concave mirror has an optical axis in a plane of a cross-section of the concave mirror and said optical axis cuts the concave mirror in a vertex (S),
    wherein the radiation sources are tilted by a tilt angle ($\omega$) around the vertex (S) relative to the optical axis of the concave mirror, and
    wherein there is a distance (d) between the radiation sources and/or the stimulation line on the one hand and the vertex (S) on the other hand, said distance (d) running along said optical axis in the plane of the cross-section of the concave mirror and satisfying the relationship $d = R \cos^2 \omega$, where R designates a radius of curvature of the concave mirror.

10. A method for detecting information which is contained in a phosphor layer, the method comprising:
    providing a concave mirror with an optical axis in a plane of a cross-section of the concave mirror, the optical axis cutting the concave mirror in a vertex,
    tilting a source of stimulation light by a tilt angle around the vertex relative to the optical axis of the concave mirror,
    setting a distance between the source of stimulation light and/or stimulation line measured along the optical axis of the concave mirror to be proportional to the square of the cosine of the tilt angle;
    generating the stimulation light and focusing the stimulation light with the concave mirror onto the phosphor layer to form the stimulation line and stimulating emission light in the phosphor layer, and
    detecting the emission light which is stimulated in the phosphor layer.

11. A method as claimed in claim 10, wherein the step of setting the distance between the source of stimulation light and/or the stimulation line comprises setting the distance to be proportional to the product of a radius of curvature of the concave mirror and the square of the cosine of the tilt angle.

* * * * *